United States Patent [19]
Shen et al.

[11] 3,869,506
[45] Mar. 4, 1975

[54] 1,2,10-TRICARBOXY PHENANTHRENE COMPOUNDS

[75] Inventors: Tsung-Ying Shen, Westfield; Howard Jones, Holmdel, both of N.J.

[73] Assignee: Merck & Co., Inc., Rahway, N.J.

[22] Filed: Oct. 5, 1972

[21] Appl. No.: 295,308

Related U.S. Application Data

[63] Continuation-in-part of Ser. No. 65,321, Aug. 19, 1970, abandoned.

[52] U.S. Cl....260/514.5, 260/346.2 M, 260/453 AP, 260/464, 260/468.5, 260/558 R, 260/563 P, 260/557 R, 260/598, 260/666 PY, 260/617.5, 424/285, 424/304, 424/305, 424/317, 424/320

[51] Int. Cl. C07c 61/30, C07c 61/36, C07c 131/02

[58] Field of Search........................ 260/468.5, 514.5

[56] References Cited
UNITED STATES PATENTS
3,689,521   9/1972   Bundy.............................. 260/468.5

Primary Examiner—Robert Gerstl
Attorney, Agent, or Firm—Mario A. Monaco; Harry E. Westlake, Jr.

[57] ABSTRACT

Phenanthrene carboxylic acid derivatives useful as anti-inflammatory agents.

4 Claims, No Drawings

1,2,10-TRICARBOXY PHENANTHRENE COMPOUNDS

This application is a continuation-in-part of application Ser. No. 65,321 filed Aug. 19, 1970 now abandoned.

This invention relates to new chemical compounds. More specifically, this invention relates to new phenanthrene carboxylic acid derivatives having the following general formula:

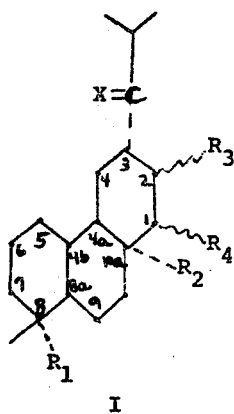

I wherein $R_1$ is hydrogen, methyl, methoxycarbonyl, carboxy, hydroxymethyl, formyl or amino; $R_2$ is hydrogen, carboxy or hydroxymethyl; $R_3$ and $R_4$ each may be hydrogen, carboxy, hydroxymethyl, methyl, cyano or together form an anhydride, imide or phenylimide ring and X is $H_2$, phenylhydrazino, =NOH or =O.

In the more preferred aspect of this invention $R_1$ is hydrogen, methyl, hydroxymethyl, amino or methoxycarbonyl; $R_2$ is hydrogen or carboxy; $R_3$ is hydrogen, methyl or carboxy; $R_4$ is hydrogen, carboxy or cyano, at least one of $R_3$ or $R_4$ being other than hydrogen, and $R_3$ and $R_4$ together form the anhydride or phenylimide and X is =O, $H_2$ or =NOH.

In the most preferred aspect of this invention $R_1$ is hydrogen, methyl or hydroxymethyl; $R_2$ is hydrogen or carboxy; $R_3$ and $R_4$ are each carboxy and X is =O.

The compounds of this invention may be prepared by ozonizing the arylonitrile and methyl abietate adduct or fumaric and maleo-pimaric acids containing the desired substituents and treating the resultant ozonide with hydrogen peroxide. Typical reaction sequences are described by the following flow sheets.

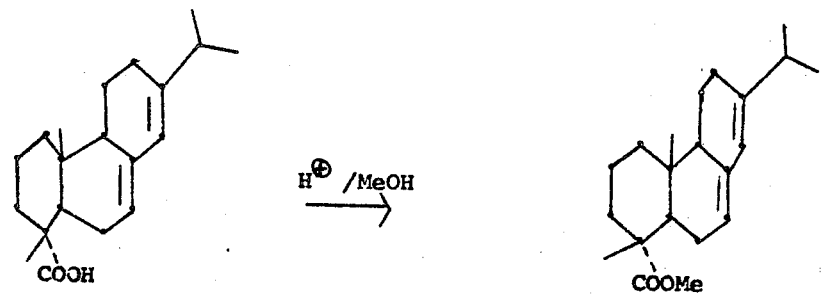

Abietic Acid

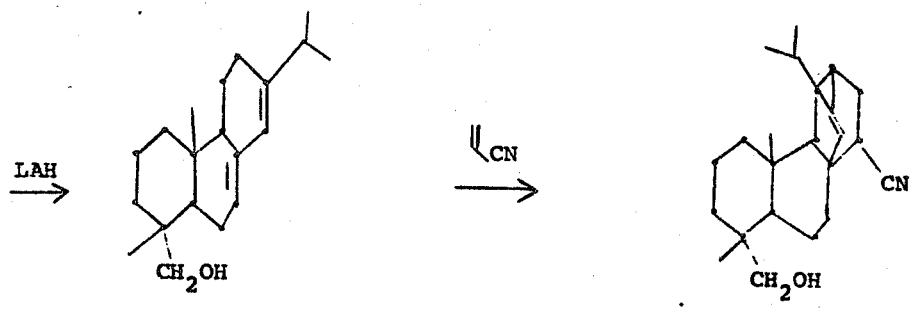

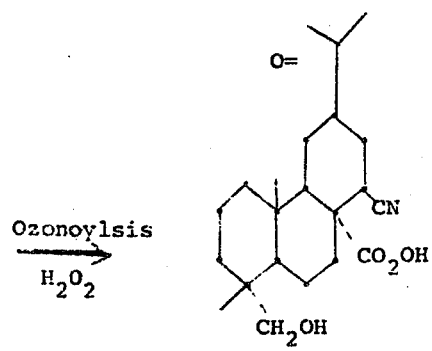

Continued
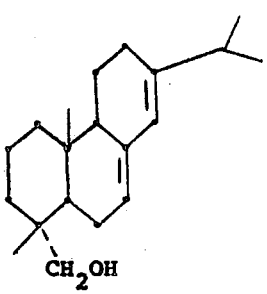  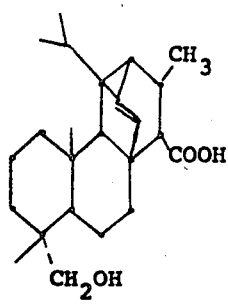
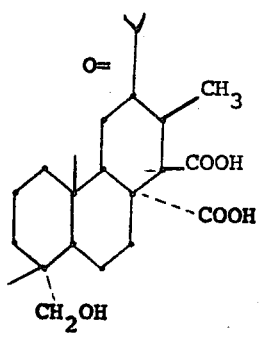
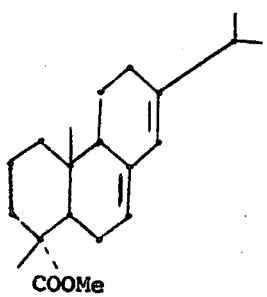  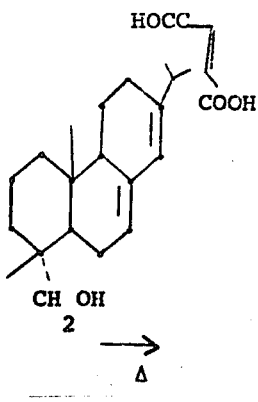
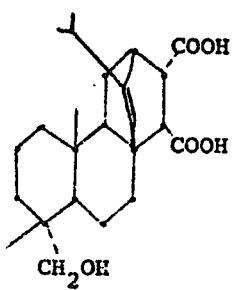  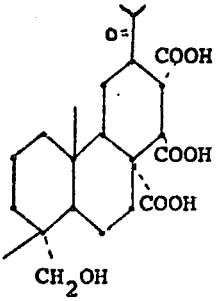
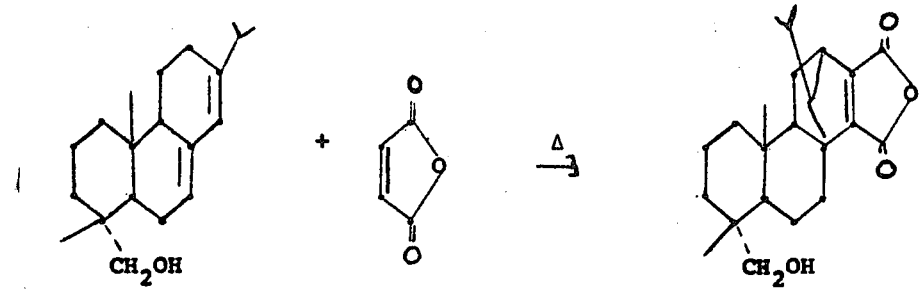

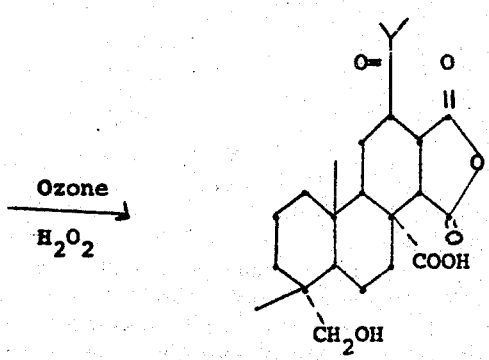

The compounds of this invention are useful in the treatment of inflammation and can be used to reduce inflammation in such diseases as rheumatoid arthritis, osterarthritis and infectious arthritis. It is believed that the anti-inflammatory activity of these compounds is due to the inhibition of complement, a group of nine serum proteins which act sequentially to produce cell destruction and to generate inflammation.

This invention also relates to a method of treating pain, fever or inflammation in patients (animal or human) using a compound of Formula I.

The treatment of inflammation in accordance with the method of the present invention is accomplished by topically, orally, rectally or parenterally administering to patients a composition of a compound of Formula I in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manner.

The compounds of Formula I and of the compositions of this invention are administered in an amount sufficient to treat inflammation, that is to reduce inflammation. Advantageously, the compositions will contain the active ingredient, namely, the compounds of Formula I in an amount of from about 50 mg. to 750 mg. per kg. body weight per day, preferably from about 250 mg. to 500 mg./kg. body weight per day.

The method of treatment of this invention comprises administering to a patient (animal or human), a compound of Formula I admixed with a non-toxic pharmaceutical carrier such as exemplified above. The compounds of Formula I will be administered in an amount of from 50 mg. to 750 mg./kg. body weight per day, preferably from about 250 mg. to about 500 mg. per kilogram body weight per day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The following examples are presented to further illustrate the invention:

EXAMPLE 1

Tetradecahydro-1α-cyano-4bβ,8β-dimethyl-3α-(2-methylpropanoyl)phenanthrene-8α-hydroxymethyl-10α-carboxylic acid A. 3,4,4a,4b,5,6,7,8,8a,9-Decahydro-8α-hydroxymethyl-4bβ,-8β-dimethyl-2-isopropylphenanthrene Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8αhydroxymethyl-4bβ,8β-dimethyl-2-isopropylphenanthrene.

B. 1-Cyano-1,2,4,4a,4b,5,6,7,8,8a,9,10-dodecahydro-12-isopropyl-4bβ,8β-dimethyl-3H,3,10a-ethenophenanthrene-8α-methanol A mixture of 10 g. (0.03 moles) of 3,4,4a,4b,5-6,7,8,8a,9-decahydro-8α-hydroxymethyl-4bβ,8β-dimethyl-2-isopropylphenanthrene and 20 ml. (0.31 mole) of acrylonitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-4bβ,8β-dimethyl-3H,3,10a-ethenophenanthrene-8α-methanol.

C. Tetradecahydro-1α-cyano-4bβ,8β-dimethyl-3α-(2-methylpropanoyl)phenanthrene-8α-hydroxymethyl-10α-carboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.,), concentrated hydrochloric acid (10 ml.). After stirring for 1 hour the precipitate is filtered off, washed well with water and dried. The tetradecahydro-1α-cyano-4bβ,8β-dimethyl-3α-(2-methylpropionoyl)phenanthrene-8α-hydroxymethyl-2β,10α-dicarboxylic acid is recrystallized from ethyl acetate.

EXAMPLE 2

Tetradecahydro-2,4bβ,8β-trimethyl-8α-hydroxymethyl-3α-(2-methylpropanoyl)phenanthrene-1α,10aα-dicarboxylic acid A.     3,4,4a,4b,5,6,7,8,8a,9-Decahydro-8α-hydroxymethyl-4bβ,-8β-dimethyl-2-isopropylphenanthrene Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered, and the filtrate is evaporated to dryness to give 3,4,4a,4b,5,6,7,8,8a,9-decahydro-8α-hydroxymethyl-4bβ,8β-dimethyl-2-isopropylphenanthrene.

B.     1-Carboxy-1,2,4,4a,4b,5,6,7,8,8a,9,10-dodecahydro-12-isopropyl-2,4bβ,8β-trimethyl-3H,3,10a-ethenophenanthrene-8α-methanol 3,4,4a,4b,5,6,7,8a,9-Decahydro-8α-hydroxymethyl-4bβ,8β-dimethyl-2-isopropylphenanthrene (1,300 g., 4.35 moles) is heated at 225° with slow stirring, and 482 g. (6.80 mole) of practical grade crotonic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether.

The ether solution is washed with water, dried over sodium sulphate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 1-carboxy-1,2,4,4a,4b,5,6,7,8,8a,9,10-dodecahydro-12-isopropyl-2,4bβ,8β-trimethyl-3H,3,10a-etheno-phenanthrene-8α-methanol.

C.     Tetradecahydro-2,4bβ,8β-trimethyl-8α-hydroxymethyl-3α-(2-methylpropanoyl) phenanthrene-1α,10aα-dicarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro2,4bβ,8β-trimethyl-8α-hydroxymethyl-3α-(2-methylpropanoyl)-phenanthrene-1α,10aα-dicarboxylic acid is recrystallized from ethyl acetate.

EXAMPLE 3

Tetradecahydro-4bβ,8β-dimethyl-8α-hydroxymethyl-3α-(2-methylpropanoyl)phenanthrene-1α,2β,10aα-tricarboxylic acid A.     3,4,4a,4b,5,6,7,8,8a,9-Decahydro-8α-hydroxymethyl-4bβ,-8β-dimethyl-2-isopropylphenanthrene Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8α-hydroxymethyl-4bβ,8β-dimethyl-2-isopropylphenanthrene.

B     1,2,4,4a,4b,5,6,7,8,8a,9,10-Dodecahydro-12-isopropyl-4bβ,8β-dimethyl-3H,3,10a-etheno-8α-hydroxymethy phenanthrene-1,2-trans-dicarboxylic acid 3,4,4a,4b,5,6,7,8a,9-Decahydro-8α-hydroxy-methyl-4bβ,8β-dimethyl-2-isopropylphenanthrene (120 g.) is heated under nitrogen to 200° prior to the addition of 124.0 g. (1.07 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct acid. The crystalline hydrate is recovered by filtration and dried in vacuum at 110° for 5 hours to yield a hemihydrate. A 10.00 g. sample of the hemihydrate is recrystallized twice from 150 ml. of chloroform-methanol (85:15). The solutions are washed with water, filtered and allowed to stand overnight for crystallization. This procedure yields a crystalline hydrate acid which when dried as above yields the hemihydrate. Drying the hemihydrate at 152° in vacuum for 6 hours yields 1,2,4,4a,4b,5,6,7,8,8 a,9,10-decahydro12-isopropyl-4bβ,8β-dimethyl-3H,3,10a-etheno-8α-hydroxymethylenephenanthrene-1,2-trans-dicarboxylic acid.

C.     Tetradecahydro-4bβ,8β-dimethyl-8α-hydroxymethyl-3α-(2-methylpropanoyl) phenanthrene-1α,2β,10aα-tricarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-4bβ,-8β-dimethyl-8α-hydroxymethyl-3α-(3-methylpropanoyl)phenanthrene-1α,2β,10aα-tricarboxylic acid is recrystallized from ethyl acetate.

EXAMPLE 4

Tetradecahydro-4bβ,8β-dimethyl-8α-hydroxymethyl-3α-(2-methylpropanoyl)phenanthrene-1β,2β,10aα-tricarboxylic acid-1β,2β-anhydride A.     3,4,4a,4b,5,6,7,8,8a,9-Decahydro-8α-hydroxymethyl-4bβ,8β-dimethyl-2-isopropylphenanthrene Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8α-hydroxymethyl-4bβ,8β-dimethyl-2-isopropylphenanthrene.

B. 1,2,4,4a,4b,5,6,7,8,8a,9,10-Dodecahydro-12-isopropyl-4bβ,8β-dimethyl-3H,3,10a-etheno-8α-hydroxymethy phenanthrene-1,2-dicarboxylic acid anhydride A mixture of 0.15 g. 3,4,4a,4b,5,6,7,8,8a,9-decahydro-8α-hydroxymethyl-4bβ,8β-dimethyl-2-isopropylphenanthrene and 0.07 g. of maleic anhydride is heated in an oil-bath at 150° for 2 hours. The product is dissolved in ether, washed neutral with water, dried over sodium sulphate, and evaporated to dryness. The 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-dicarboxylic acid anhydride is crystallized from benzene-isooctane.

C. Tetradecahydro-4bβ,8β-dimethyl-8α-hydroxymethyl-3α-(2-methylpropanoyl) phenanthrene-1β,2β,10aα-tricarboxylic acid-1β,2β-anhydride A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-4bβ,8β-dimethyl-8α-hydroxymethyl-3α-(2-methylpropionoyl)phenanthrene-1β,2β,10aα-tricarboxylic acid-1β,2β-anhydride is recrystallized from ethyl acetate.

EXAMPLE 5

Tetradecahydro-1α-cyano-4bβ,8α,8β-trimethyl-3α-(2-methylpropanoyl)phenanthrene-10α-carboxylic acid A. 3,4,4a,4b,5,6,7,8,8a,9-Decahydro-8α-hydroxymethyl-4bβ,8β-dimethyl-2-isopropylphenanthrene Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8α-hydroxymethyl-4bβ,8β-dimethyl-2-isopropylphenanthrene.

8α-Carboxyaldehyde-3,4,4a,4b,5,6,7,8,8a,9-decahydro4bβ,8β-dimethyl-2-isopropylphenanthrene 3,4,4a,4b,5,6,7,8,8a,9-Decahydro-8α-hydroxymethyl-4bβ,8β-dimethyl-2-isopropylphenanthrene (1.0 g.) is oxidized with chromic oxide (0.5 g.) in glacial acetic acid (20 ml.) at 50° over 3 hours and then evaporated to 5 ml. It is poured into ice-water and the precipitated 8α-carboxyaldehyde-3,4,4a,4b,5,6,7,8,8a,9-decahydro-4bβ,8β-dimethyl-2-isopropylphenanthrene (0.84 g.) is collected and dried.

C. 3,4,4a,4b,5,6,7,8,8a,9-Decahydro-4bβ,8β-8α-trimethyl-2-isopropylphenanthrene

8α-Carboxyaldehyde-3,4,4a,4b,5,6,7,8,8a,9-decahydro-4bβ,8β-dimethyl-2-isopropylphenanthrene (1.0 g.) is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,5,6,7,8,8a,9-decahydro-4bβ,8β-8α-trimethyl-2-isopropylphenanthrene.

D. 1-Cyano-1,2,4,4a,4b,5,6,7,8a,9,10-dodecahydro-12-isopropyl-4bβ, 8α, 8β-trimethyl-3H, 3, 10a-ethenophenanthrene A mixture of 10 g. (0.03 mole) of 3,4,4a,4b,5,6,7,8,-8a,9-decahydro-4bβ,8β,8α-trimethyl-2-isopropylphenanthrene and 20 ml. (0.31 mole) of acrylonitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-4bβ,8α,8β-trimethyl-3H,3,10a-ethenophenanthrene.

E. Tetradecahydro-1α-cyano-4bβ,8α,8β-trimethyl-3α-(2-methylpropanoyl)phenanthrene-10α-carboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-1α-cyano-4bβ,8α,8β-trimethyl-3α-(2-methylpropionoyl)phenanthrene-2β,10α-dicarboxylic acid is recrystallized from ethyl acetate.

EXAMPLE 6

Tetradecahydro-1α-cyano-2β,4bβ,8α,8β-tetramethyl-3α-(2-methylpropanoyl)phenanthrene-10aα-carboxylic acid A. 3,4,4a,4b,5,6,7,8,8a,9-Decahydro-4bβ,8β,8α-trimethyl-2-isopropylphenanthrene 8α-Carboxyaldehyde-3,4,4a,4b,5,6,7,8,8a,9-decahydro-4bβ,8β-dimethyl-2-isopropylphenanthrene (1.0 g.) prepared as in Example 5, part B, is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,-5,6,7,8,8a,9-decahydro4bβ,8β,8α-trimethyl-2-isopropylphenanthrene.

B. 1-Cyano-1,2,4,4a,4b,5,6,7,8,8a,9,10-dodecahydro-12-isopropyl-4bβ,8α,8β-tetramethyl-3H,3,10a-ethenophenanthrene A mixture of 10 g. (0.03 mole) of 3,4,4a,4b5,6,7,8,8a,9-decahydro-4bβ,8β,8α-trimethyl-2-isopropylphenanthrene, prepared according to the procedure of Example 3, and 20 ml. (0.31 mole) of crotononitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-2β,4bβ,8α,8β-tetramethyl-3H,3,10a-ethenophenanthrene.

C. Tetradecahydro-1α-cyano-2β,4bβ,8α,8β-tetramethyl-3α-(2-methylpropanoyl)phenanthrene-10aα-carboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-1α-cyano-2β,4bβ,8α,8β-tetramethyl-3α-(2-methylpropanoyl)phenanthrene-10aα-carboxylic acid is recrystallized from ethyl acetate.

EXAMPLE 7

Tetradecahydro-2,4bβ,8α,8β-tetramethyl-3α-(2-methylpropanoyl) phenanthrene-1α,10aα-dicarboxylic acid A. 1,2,4,4a,4b,5,6,7,8,8a,9,10-Dodeca-12-isopropyl-2,4bβ,8α,8β-tetramethyl-3H,3,10a-ethenophenanthrene-1-carboxylic acid 3,4,4a,4b,5,6,7,8,8a,9-Decahydro-4bβ,8β,8α-trimethyl-2-isopropylphenanthrene 3.4 g. (0.014 mole) prepared as in Example 6, part A, is heated at 225° with slow stirring, and 1.6 g. (0.021 mole) of practical grade crotonic acid is added during 1 hour. Heating at 225° is continued for 4 hours. The product is dissolved in 20 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulphate and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 1,2,4,-4a,4b,5,6,7,8,8a,9,10-dodeca-12-isopropyl-2,4bβ,8α,8β-tetramethyl-3H,3,10a-ethenophenanthrene-1-carboxylic acid.

B. Tetradecahydro-2,4bβ,8α,8β-tetramethyl-3α-(2-methylpropanoyl) phenanthrene-1α,10aα-dicarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-2,4bβ,8α,8β-tetramethyl-3α-(2-methylpropionoyl)phenanthrene-1α,10aα-dicarboxylic acid is recrystallized from ethyl acetate.

EXAMPLE 8

Tetradecahydro-4bβ,8α,8β-trimethyl-3α-(2-methylpropanoyl)-phenanthrene-1α,2β,10aα-tricarboxylic acid A. 1,2,4,4a,4b,5,6,7,8,8a,9,10-Dodecahydro-12-isopropyl-4bβ,8α,8β-trimethyl-3H,3,10a-ethenophenanthrene-1,2-trans-dicarboxylic acid 3,4,4a,4b,5,6,7,8,8a,9-Decahydro-4bβ,8β,8α-trimethyl-2-isopropylphenanthrene (120 g.) prepared as in Example 6, part A, is heated under nitrogen to 200° prior to the addition of 124.0 g. (1.07 mole, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield 1,2,4,4a,4b,5,6,7,8,8a,9,10-dodecahydro-12-isopropyl-4bβ,8α,8β-trimethyl-3H,3,10a-ethenophenanthrene-1,2-trans-dicarboxylic acid.

B. Tetradecahydro-4bβ,8α,8β-trimethyl-3α-(2-methylpropanoyl) phenanthrene-1α,2β,10aα-tricarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-4bβ,8α,8β-trimethyl-3α-(2-methylpropionyl)phenanthrene-1α,2β,10aα-tricarboxylic acid is recrystallized from ethyl acetate.

EXAMPLE 9

Tetradecahydro-4bβ,8α,8β-trimethyl-3α-(2-methylpropanoyl)-phenanthrene-1β,2β,10aα-tricarboxylic acid-1β,2β-anhydride A. 1,2,4,4a,4b,5,6,7,8,8a,9,10-Dodecahydro-12-isopropyl-4bβ,8α,8β-trimethyl-3H,3,10a-ethenophenanthrene-1,2-dicarboxylic acid anhydride A mixture of 0.15 g. 3,4,4a,4b,5,6,7,8,8a,9-decahydro-4bβ,8β,8α-trimethyl-2-isopropylphenanthrene prepared as in Example 6, part A, and 0.07 g. of maleic anhydride is heated in an oil-bath at 150° for 2 hours. The product is dissolved in ether, washed neutral with water, dried over sodium sulphate, and evaporated to dryness. The 1,2,4,4a,4b,-5,6,7,8,8a,9,10-dodecahydro-12-isopropyl-4bβ,8α,8β-trimethyl-3H,3,10a-ethenophenanthrene-1,2-dicarboxylic acid anhydride is crystallized from benzene-isooctane.

B. Tetradecahydro-4bβ,8α,8β-trimethyl-3α-(2-methylpropanoyl) phenanthrene-1β,2β,10aα-tricarboxylic acid-1β,2β-anhydride A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-4bβ,8α,8β-trimethyl-3α-(2-methylpropionoyl)phenanthrene-1β,2β,10aα-tricarboxylic acid-1β,2β-anhydride is recrystallized from ethyl acetate.

EXAMPLE 10

Tetradecahydro-8α-carboxamido-4bβ,8β-dimethyl-3α-(2-methylpropanoyl) phenanthrene-2β,10α-dicarboxylic acid A. 8αCarboxamido-3,4,4a,4b,5,6,7,8,8a,9-decahydro-4bβ,8β-dimethyl-2-isopropylphenanthrene Abietic acid (2 g.) is dissolved in methylene chloride (10 ml.) and refluxed with distilled thionyl chloride (10 ml.) containing one drop of dimethylformamide for 5 hours. The mixture is evaporated to dryness and the acyl chloride recrystallized from benzene.

The acid chloride (1.4 g.) is stirred in ethyl acetate at 5° while concentrated ammonium hydroxide is added. The precipitated amide is filtered off and dried.

B. 8α-Carboxamido-1,2,4,4a,4b,5,6,7,8,8a,9,10-dodeca-12-isopropyl-2,4bβ,8β-trimethyl-3H, 3,10a-ethenophenanthrene-1-carboxylic acid 8α-Carboxamido-3,4,4a,4b,5,6,7,8,8a,9-decahydro-4bβ,8β-dimethyl-2-isopropylphenanthrene 27 g. is heated at 180° with slow stirring and 0.8 g. practical grade crotonic acid is added during 1 hour. Heating at 160° is continued for 4 hours. The product is dissolved in 50 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulphate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 8α-carboxamido-1,2,4,4a,4b,5,6,7,8,8a,9,10-dodeca-12-isopropyl-2,4bβ,8β-trimethyl-3H, 3,10a-ethenophenanthrene-1-carboxylic acid.

C. Tetradecahydro-8α-carboxamido-2,4bβ,8β-trimethyl-3α-(2-methylpropanoyl)phenanthrene-1,10α-dicarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-carboxamido-2,4bβ,8β-trimethyl-3α-(2-methylpropanoyl)phenanthrene-1,10α-dicarboxylic acid is recrystallized from ethyl acetate.

EXAMPLE 11

Tetradecahydro-8α-carboxamido-4bβ,8β-dimethyl-3α-(2-methylpropanoyl) phenanthrene-1α,2β,10aα-tricarboxylic acid A. 8α-Carboxamido-1,2,4,4a,4b,5,6,7,8,8a,9,10-dodecahydro-12-isopropyl-4bβ,8β-dimethyl-3H, 3,10a-ethenophenanthrene-1,2-trans-dicarboxylic acid 8α-carboxamido-3,4,4a,4b,5,6,7,8,8a,9-decahydro4bβ,8β-dimethyl-2-isopropylphenanthrene (12.0 g.) prepared as in Example 10, part A, is heated under nitrogen to 200° prior to the addition of 12.4 g. (0.11 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield 8α-carboxamido-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid.

B. Tetradecahydro-8α-carboxamido-4bβ,8β-dimethyl-3α-(2-methylpropanoyl) phenanthrene-1α,2β,10aα-tricarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-carboxamido-4bβ,8β-dimethyl-3α-(2-methylpropionoyl)phenanthrene-1α,2β,10aα-tricarboxylic acid is recrystallized from ethyl acetate.

EXAMPLE 12

Tetradecahydro-8α-carboxamido-4bβ,8β-dimethyl-3α-(2-methylpropanoyl) phenanthrene-1β,2β,10aα-tricarboxylic acid-1β,2β-anhydride A. 8α-Carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A mixture of 0.15 g. of 8α-carboxamido-3,4,4a,4b,5,6,7,8,8a,9-decahydro-4bβ,8β-dimethyl-2-isopropylphenanthrene prepared as in Example 10, part A, and 0.07 g. of maleic anhydride is heated in an oil-bath at 150° for 2 hours. The product is dissolved in ether, washed neutral with water, dried over sodium sulphate, and evaporated to dryness. The 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride is crystallized from benzene-isooctane.

B. Tetradecahydro-8α-carboxamido-4bβ,8β-dimethyl-3α-(2-methylpropanoyl) phenanthrene-1β,2β,10aα-tricarboxylic acid-1β,2β-anhydride A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-carboxamido-4bβ,8β-dimethyl-3α-(2-methylpropanoyl)phenanthrene- 1β,2β,10aα-tricarboxylic acid-1β,2β-anhydride is recrystallized from ethyl acetate.

EXAMPLE 13

Tetradecahydro-8α-ureidomethyl-4bβ,8β-dimethyl-3α-(2-methylpropanoyl)-phenanthrene-1α,2β,10aα-tricarboxylic acid A. Methyl-3,4,4a,4b,5,6,7,8,8a,9-decahydro-4bβ,8β-dimethyl-2-isopropylphenanthrene-8α-urethane Abietic acid (2.0 g., 0.005 molei) is refluxed in distilled thionyl chloride (25 ml.) containing one drop of dimethylformamide for 5 hours, evaporated to dryness and the acyl chloride recrystallized from benzene.

A solution of sodium azide (0.33 g., 0.005 mole) in water (0.2 ml.) is added slowly with stirring at 0° to a solution of the acyl chloride (1.05 g., 0.002 mole) in acetone:dioxane (1:1 40 ml.) over 30 minutes. The solution is allowed to warm to 40° over 2 hours, filtered and dried over magnesium sulphate. The azide was crystallized by evaporation of the solvent at 20°.

A solution of the azide (1.23 g., 0.003 mole) in dry acetone (10 ml.) is dropped into boiling toluene over 10 minutes and the resulting solution evaporated to dryness. The solid isocyanate is recrystallized from benzene.

The portion of the isocyanate prepared above (0.3 g., 0.0007 mole) is refluxed in methanol for 20 minutes to give the crystalline methyl-3,4,4a,4b,5,6,7,8,8a,9-decahydro-4bβ,8β-dimethyl-2-isopropylphenanthrene-8α-urethane.

B. Methyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid-8-α-carbamate Methyl-3,4,4,a,4b,5,6,7,8,8a,9-decahydro-4bβ,8β-dimethyl-2-isopropylphenanthrene-8α-urethane (12.0 g.) is heated under nitrogen to 200° prior to the addition of 12.4 g. (0.11 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield methyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid-8-α-carbamate.

C. Tetradecahydro-8α-ureidomethyl-4bβ,8β-dimethyl-3α-(2-methylpropanoyl) phenanthrene-1α,2β,10aα-tricarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-ureidomethyl-4bβ,8β-dimethyl-3α-(2-methylpropanoyl)phenanthrene-1α,2β,10aα-tricarboxylic acid is recrystallized from ethyl acetate.

EXAMPLE 14

Tetradecahydro-8α-ureidomethyl-4bβ,8β-dimethyl-3α-(2-methylpropyanoyl phenanthrene-1β,2β,10aα-tricarboxylic acid-1β,2β-anhydride and Tetradecahydro-8α-ureidoisopropyl-4bβ,8β-dimethyl-3α-(2-methylpropanoyl)phenanthrene-1β,2β,10aα-tricarboxylic acid-1β,2β-anhydride A. methyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate and Isopropylmethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate Maleopimaric acid (2.0 g., 0.005 mole) is refluxed in distilled thionyl chloride (25 ml.) containing one drop of dimethylformamide for 5 hours, evaporated to dryness and the acyl chloride recrystallized from benzene, m.p. 164°–165°.

A solution of sodium azide (0.33 g., 0.005 mole) in water (0.2 ml.) is added slowly with stirring at 0° to a solution of the acyl chloride (1.05 g., 0.002 mole) in acetone:dioxane (1:1 40 ml.) over 30 minutes. The solution is allowed to warm to 40° over 2 hours, filtered and dried over magnesium sulphate. The crystals of azide resulting from evaporation of the solvent at 20° have m.p. 115°–115° (dec.).

A solution of the azide (1.23 g., 0.003 mole) in dry acetone (10 ml.) is dropped into boiling toluene over 10 minutes and the resulting solution evaporated to dryness. The solid isocyanate is recrystallized from benzene and has m.p. 120°–121° (dec.).

A portion of the isocyanate prepared above (0.3 g., 0.0007 mole) is refluxed in isopropanol for 20 minutes to give the crystalline methyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate, m.p. 155°–157° (dec.).

Another portion of the isocyanate prepared above (0.3 g., 0.0008 mole) is refluxed for 10 minutes in a constant boiling mixture of methanol in toluene (about 3%) and the crystalline isopropylmethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate has m.p. 162°–164° (dec.).

B. Tetradecahydro-8α-ureidomethyl-4bβ,8β-dimethyl-3α-(2-methylpropanoyl) phenanthrene-1β,2β,10aα-tricarboxylic acid-1β,2β-anhydride and Tetradecahydro-8α-ureidoisopropyl-4bβ,8β-dimethyl-3α-(2-methylpropanoyl)phenanthrene-1β,2β,10aα-tricarboxylic acid-1β,2β-anhydride A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10ml.). After stirring for 1 hour the precipitate is filtered off, washed well with water and dried. The tetradecahydro-8α-ureidomethyl-4bβ,8β-dimethyl-3α-(2-methylpropanoyl)phenanthrene-1β,2β,10aα-tricarboxylic acid-1β,2β-anhydride and tetradecahydro-8α-ureidoisopropyl-4bβ, 8β-dimethyl-3α-(2-methylpropyanoyl) phenanthrene-1β,2β,10aα-tricarboxylic acid-1β,2β-anhydride are recrystallized from ethyl acetate.

EXAMPLE 15

Methyl tetradecahydro-2,4bβ,8β-trimethyl-3α-(2-methylpropanoyl) phenanthrene-1α,10aα-dicarboxylic acid-8α-carboxylate A. Methyl-3,4,4a,4b,5,6,7,8,8a,9-decahydro-4bβ,8β-dimethyl-2-isopropylphenanthrene-8α-carboxylate Abietic acid (4 g.) is dissolved in methanol alcohol (40 ml.) and concentrated sulphuric acid is added (0.5 ml.). The mixture is refluxed for 5 hours and evaporated to a volume of 10 ml. The reaction mixture is poured into water (200 ml.) and the methyl-3,4,4a,4b,5,6,7,8,8a,9-decahydro-4bβ,8β-dimethyl-2-isopropylphenanthrene-8α-carboxylate filtered off.

B. Methyl-1-carboxy-1,2,4,4a,4b,5,6,7,8,8a,9,10-dodecahydro-12-isopropyl-2,4bβ,8β-trimethyl-3H,3,10a-ethenophenanthrene-8α-carboxylate Methyl-3,4,4a,4b,5,6,7,8,8a,9-decahydro-4bβ,8β-dimethyl-2-isopropylphenanthrene-8α-carboxylate 6.0 g. (0.02 moles) is heated at 225° with slow stirring, and 2.58 g. (0.03 moles) of practical grade crotonic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulphate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give methyl-1-carboxy-1,2,4,4a,4b,5,6,7,8,8a,9,10-dodecahydro-12-isopropyl- 2,4bβ,8β-trimethyl-3H,3,10a-ethenophenanthrene-8α-carboxylate.

C. Methyl tetradecahydro-2,4bβ,8β-trimethyl-3α-(2-methylpropanoyl) phenanthrene-1α,10aα-dicarboxylic acid-8α-carboxylate A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The methyl tetradecahydro-2,4bβ,8β-trimethyl-3α-(2-methylpropanoyl)phenanthrene-1α,10aα-dicarboxylic acid-8α-carboxylate is recrystallized from ethyl acetate.

EXAMPLE 16

Methyl Tetradodecahydro-4bβ,8β-dimethyl-3α-(2-methylpropanoyl) phenanthrene-1α,2β,10aα-tricarboxylic acid-8α-carboxylate A. 8α-Carboxymethyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid Methyl-3,4,4a,4b,5,6,7,8,8a,9-decahydro-4bβ,8β-dimethyl-2-isopropylphenanthrene-8α-carboxylate 3.6 g. (0.032 moles) prepared as in Example 15, part A, is heated under nitrogen to 200° prior to the addition of 5.15 g. (0.053 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline hydrate is recovered by filtration and dried in vacuum at 110° for 5 hours to yield a hemihydrate. The 10.00 g. sample of the hemihydrate is recrystallized twice from 150 ml. of chloroformmethanol (85:15). The solutions are washed with water, filtered and allowed to stand overnight for crystallization. This procedure yields a crystalline hydrate acid which when dried as above yields the hemihydrate. Drying the hemihydrate at 152° in vacuum for 6 hours yields 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid.

B. Methyl tetradodecahydro-4bβ,8β-dimethyl-3α-(2-methylpropanoyl) phenanthrene-1α,2β,10aα-tricarboxylic acid 8α-carboxylate A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The methyl tetradodecahydro-4bβ,8β-dimethyl-3α-(2-methylpropanoyl) phenanthrene-1α,2β,10aα-tricarboxylic acid-8α-carboxylate is recrystallized from ethyl acetate.

EXAMPLE 17

Methyl tetradodecahydro-4bβ,8β-dimethyl-3α-(2-methylpropanoyl phenanthrene-1β,2β,10aα-tricarboxylic acid-1β,2β-anhydride-8α-carboxylate A. 8α-Carboxymethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A mixture of 0.15 g. of methyl-3,4,4a,4b,5,6,7,8,8a,9-decahydro-4bβ,8β-dimethyl-2-isopropylphenanthrene-8α-carboxylate prepared as in Example 15, part A, and 0.07 g. of maleic anhydride is heated in an oil-bath at 150° for 2 hours. The product is dissolved in ether, washed neutral with water, dried over sodium sulphate, and evaporated to dryness. The 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride is crystallized from benzene-isooctane.

B. Methyl tetradodecahydro-4bβ,8β-dimethyl-3α-(2-methylpropanoyl) phenanthrene-1β,2β,10aα-tricarboxylic acid-1β,2β-anhydride-8α-carboxylate A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The methyl tetradodecahydro-4bβ,8β-dimethyl-3α-(2-methylpropanoyl) phenanthrene-1β,2β,10aα-tricarboxylic acid-1β,2β-anhydride-8α-carboxylate is recrystallized from ethyl acetate.

EXAMPLE 18

Tetradecahydro-8α-amino-2,4bβ,8β-trimethyl-3α-(2-methylpropanoyl) phenanthrene-1α,10aα-dicarboxylic acid A. 3,4,4a,4b,5,6,7,8,8a,9-Decahydro-4bβ,8β-dimethyl-2-isopropylphenanthrene-8α-ammonium chloride 0.9 G. of methyl-3,4,4a,4b,5,6,7,8,8a,9-decahydro-4bβ,8β-dimethyl-2-isopropylphenanthrene-8α-urethane prepared as in Example 13, part A, is refluxed in 20 ml. 2.5N hydrochloric acid solution and then after 30 minutes evaporated to dryness. The title compound is collected. The free base can be isolated by dissolving 1 g. of the amine hydrochloride in 20 ml. methanol containing 0.5 g. sodium methoxide, adding water and filtering.

B. 8α-Amino-1,2,4,4a,4b,5,6,7,8,8a,9,10-dodecahydro-12-isopropyl-2,4bβ,8β-trimethyl-3H,3,10a-etheno-phenanthrene-1-carboxylic acid 3,4,4a,4b,5,6,7,8,8a,9-dodecahydro-12-isopropyl-2,4bβ,8β-trimethyl-3H,3,10a-ethenophenanthrene-1-carboxylic acid 3,4,4a,4b,5,6,7,8,8a,9-Decahydro-4bβ,8β-dimethyl-2-isopropylphenanthrene-8α-ammonium chloride 6.0 g. (0.023 moles) is heated at 225° with slow stirring, and 2.58 g. (0.03 moles) of practical grade crotonic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulphate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 8α-amino-1,2,4,4a,4b,5,6,7,8,8a,9,10-dodecahydro-12-isopropyl-2,4bβ,8β-trimethyl-3H,3,10a-ethenophenanthrene-1-carboxylic acid.

C. Tetradecahydro-8α-amino-2,4bβ,8β-trimethyl-3α-(2-methylpropanoyl) phenanthrene-1α,10aα-dicarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-amino-2,4bβ,8β-trimethyl-3α-(2-methylpropionoyl)phenanthrene-1α,10aα-dicarboxylic acid is recrystallized from ethyl acetate.

EXAMPLE 19

Tetradecahydro-8α-amino-4bβ,8β-dimethyl-3α-(2-methylpropanoyl) phenanthrene-1α,2β,10aα-tricarboxylic acid A. 3,4,4a,4b,5,6,7,8,8a,9,-Decahydro-4bβ,8β-dimethyl-2-isopropylphenanthrene-8α-ammonium chloride 0.9 G. of methyl-3,4,4a,4b,5,6,7,8,8a,9-decahydro-4bβ,8β-dimethyl-2-isopropylphenanthrene-8α-urethane prepared as in Example 13, part A, is refluxed in 20 ml. 2.5N hydrochloric acid solution and then after 30 minutes evaporated to dryness. The title compound is collected. The free base can be isolated by dissolving 1 g. of the amine hydrochloride in 20 ml. methanol containing 0.5 g. sodium methoxide, adding water and filtering.

8α-Amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid A mixture of 0.45 g. of 3,4,4a,4b,5,6,7,8,8a,9-decahydro-4bβ,8β-dimethyl-2-isopropylphenanthrene-8α-ammonium chloride and 0.21 g. of fumaric acid is heated in an oil-bath at 150° for 2 hours. The product is dissolved in ether, washed neutral with water, dried over sodium sulphate, and evaporated to dryness. The 8α-amino 1,2,4,4a,4b,5,6,7,8,8a,9,10-dodecahydro-12-isopropyl-4bβ,8β-dimethyl-3H,3,10a-ethenophenanthrene-1,2-dicarboxylic acid is crystallized from benzene-isooctane.

C. Tetradecahydro-8α-amino-4bβ,8β-dimethyl-3α-(2-methylpropanoyl) phenanthrene-1α,2β,10aα-tricarboxylic acid A solution of the above compound (5.0 g.) in methanol is ozonized at −70°. The reaction mixture turns a deep blue upon completion. The reaction mixture is then poured into a solution of 5–5.25% sodium hypochlorite in water (70 ml.), ice-cold water (300 ml.), methanol (100 ml.), ice (200 g.), concentrated hydrochloric acid (10 ml.). After stirring for 1 hour the precipitate is filtered off, washed well with water and dried. The tetradecahydro-8α-amino-4bβ,8β-dimethyl-3α-(2-methylpropanoyl)phenanthrene-1α,2β,10aα-tricarboxylic acid is recrystallized from ethyl acetate.

EXAMPLE 20

A. Preparation of Phenylimides of Anhydrides Prepared in Previous Examples

The anhydrides (1.0 g.) are heated at 140° for 3 days with excess aniline. The mixtures are cooled and the crystalline materials washed with chloroform. In this way the following phenylimides are made from the listed anhydride starting materials.

| Anhydride | Phenylimide |
| --- | --- |
| 1,2,4,4a,4b,5,6,7,8,8a,9,10-dodecahydro-12-isopropyl-4bBβ 8β-dimethyl-3H,3,10a-etheno 8α-hydroxymethylenephenanthrene-1,2-dicarboxylic acid anhydride | 1,2,4,4a,4b,5,6,7,8,8a,9a-10-dodecahydro-12-isopropyl-4bβ,8β-dimethyl-3H,3,-10a-etheno-8α-hydroxymethylenephenanthrene-1,2-dicarboxylic acid phenylimide |
| 1,2,4,4a,4b,5,6,7,8,8a,9,10-dodecahydro-12-isopropyl-4bβ-8α,8β-trimethyl-3H,3,10a-etheneophenanthrene-1,2-dicarboxylic acid anhydride | 1,2,4,4a,4b,5,6,7,8,8a,9,-10-dodecahydro-12-isopropyl-4bβ,8α,8β-trimethyl-3H,3,10a-ethenophenanthrene-1,2-dicarboxylic acid phenylimide |

| Anhydride | Phenylimide |
|---|---|
| 8α-carboxamido-1,2,4,4a,4b,-5,6,7,8,8a,9,10-dodecahydro-12-isopropyl-4bβ,8β-dimethyl 3H,3,10a-ethenophenanthrene-1,2-dicarboxylic acid anhydride | 8α-carboxamido-1,2,4,4a,-4b,5,6,7,8,8a,9,10-dodecahydro-12-isopropyl-4bβ,8β-dimethyl-3H,3,10a-ethenophenanthrene-1,2-dicarboxylic acid phenylimide |
| 8α-carboxymethyl-1,2,4,4a,4b,-5,6,7,8,8a,9,10-dodecahydro-12-isopropyl-4bβ,8β-dimethyl-3H,3,10a-ethenophenanthrene-1,2-carboxylic acid anhydride | 8α-carboxymethyl-1,2,4,4a,-4b,5,6,7,8,8a,9,10-dodecahydro-12-isopropyl-4bβ,8β-dimethyl-3H,3,10a-ethenophenanthrene-1,2-carboxylic acid phenylimide |
| 8α-amino-1,2,4,4a,4b,5,6,7,-8,8a,9,10-dodecahydro-12-isopropyl-4bβ,8β-dimethyl-3H,3,-10a-etheneophenanthrene-1,2-dicarboxylic acid anhydride | 8α-amino-1,2,4,4a,4b,5,6,-7,8,8a,9,10-dodecahydro-12-isopropyl-4bβ,8β-dimethyl-3H,3,10a-ethenophenanthrene-1,2-dicarboxylic acid phenylimide |

B. The above phenylimides are then ozonized as described for Example 1, part C, and give the corresponding products named below.

| Phenylimide | Ozonized Product |
|---|---|
| 1,2,4,4a,4b,5,6,7,8,8a,9,10-dodecahydro-12-isopropyl-4bβ,-8β-dimethyl-3H,3,10a-etheno-8α-hydroxymethylenephenanthrene-1,2-dicarboxylic acid phenylimide | tetradecahydro-4β,8β-dimethyl-8β-hydroxymethyl-3α-(2-methylpropanoyl)-phenanthrene-1β,2β-dicarboxylic acid phenylimide-10aα-carboxylic acid |
| 1,2,4,4a,4b,5,6,7,8,8a,9,10-dodecahydro-12-isopropyl-4bβ,-8α,8β-trimethyl-3H,3,10a-ethenophenanthrene-1,2-dicarboxylic acid phenylimide | tetradecahydro-4bβ,8α,8β-trimethyl-3α-(2-methylpropanoyl) phenanthrene-1β,-2β-dicarboxylic acid phenylimide-10aα-carboxylic acid |
| 8α-carboxamido-1,2,4,4a,4b,-5,6,7,8,8a,9,10-dodccahydro-12-isopropyl-4bβ,8β-dimethyl-3H,3,10a-ethenophenanthrene-1,2-dicarboxylic acid phenylimide | tetradecahydro-4bβ,8β-dimethyl-3α-(2-methylpropanoyl) phenanthrene-1,2-dicarboxylic acid phenylimide-8α-carboxamide. |
| 8α-carboxymethyl-1,2,4,4a,4b,-5,6,7,8,8a,9,10-dodecahydro-12-isopropyl-4bβ,8β-dimethyl-3H,3,10a-ethenophenanthrene-1,2-carboxylic acid phenylimide | tetradecahydro-8α-carboxymethyl-4bβ,8β-dimethyl-3α-(2-methylpropanoyl)phenanthrene-1,2-dicarboxylic acid phenylimide |
| 8α-amino-1,2,4,4a,4b,5,6-7,8,8a,9,10-dodecahydro-12-isopropyl-4bβ,8β-dimethyl-3H,3,10a-ethenophenanthrene-1,2-dicarboxylic acid phenylimide | tetradecahydro-8α-amino-4bβ,8β-dimethyl-3α-(2-methylpropanoyl)-phenanthrene-1,2-dicarboxylic acid phenylimide |

EXAMPLE 21

Reduced Products of Ketones

The compound (5 g.) is refluxed with stirring in concentrated hydrochloric acid (30 ml.) for 24–30 hours with zinc-mercury amalgam. The solution is cooled, diluted and extracted with ethyl acetate (6 × 100 ml.). The organic layer is washed with water, separated, dried and filtered. Evaporation of the solvent gives the reduced materials named below.

| Ketone | Reduced Material |
|---|---|
| tetradecahydro-2,4bβ,8β-trimethyl-8α-hydroxymethyl-3α-(2-methylpropanoyl)phenanthrene-1a,10aα-dicarboxylic acid | tetradecahydro-2,4bβ,8β-trimethyl-8α-hydroxymethyl-3α-iso-butyl phenanthrene-1α,10aα-dicarboxylic acid |
| tetradecahydro-4bβ,8β-dimethyl-8α-hydroxymethyl-(2-methylpropanoyl)phenanthrene-1α,2β,10aα-tricarboxylic acid | tetradecahydro-4bβ,8β-dimethyl-8α-hydroxymethyl-3α-iso-butyl phenanthrene-1α,2β,10aα-tricarboxylic acid |
| tetradecahydro-4bβ,8β-dimethyl-3α-(2-methylpropanoyl) phenanthrene-1,2-dicarboxylic acid phenyl imide-8α-carboxamide | tetradecahydro-4bβ,8β-dimethyl-3α-iso-butyl phenanthrene-1,2-dicarboxylic acid phenylimide-8α-carboxamide |
| tetradecahydro-8α-carboxymethyl-4bβ,8β-dimethyl-3α-(2-methylpropanoyl) phenanthrene-1,2-dicarboxylic acid phenylimide | tetradecahydro-8α-carboxymethyl-4bβ,8β-dimethyl-3α-iso-butyl phenanthrene-1,2-dicarboxylic acid phenylimide |
| tetradecahydro-8α-amino-4bβ,8β-dimethyl-3α-(2-methylpropanoyl)phenanthrene-1,2-dicarboxylic acid phenylimide | tetradecahydro-8α-amino-4bβ,8β-dimethyl-3α-iso-butyl phenanthrene-1,2-dicarboxylic acid phenylimide |

EXAMPLE 22

Preparation of Oximes of the Ketones

The oximes are obtained by dissolving the ketone (1.0 g.) in 1:1 methanol water (10 ml.) and shaking with 1 mole of hydroxylamine hydrochloride and 2 moles of sodium acetate, filtering and recrystallizing from aqueous methanol.

| Ketone | Oxime |
|---|---|
| tetradecahydro-2,4bβ,8β-trimethyl-8α-hydroxymethyl-3α-92-methylpropanoyl)phenanthrene-1a,10aα-dicarboxylic acid | tetradecahydro-2,4bβ,8β-trimethyl-8α-hydroxymethyl-3α-(2-methylpropoxime)-phenanthrene-1a,10aα-dicarboxylic acid |
| tetradecahydro-4bβ,8β-dimethyl-8α-hydroxymethyl-3α-(2-methylpropanoyl)phenanthrene-1α,2β,10aα-tricarboxylic acid | tetradecahydro-4bβ,8β-dimethyl-8α-hydroxymethyl-3α-(2-methylpropoxime)-phenanthrene-1α,2β,10aβ-tricarboxylic acid |
| tetradecahydro-4bβ,8β-dimethyl-3α-(2-methylpropanoyl)phenanthrene-1,2-dicarboxylic acid phenylimide-8α-carboxamide | tetradecahydro-4bβ,8β-dimethyl-3α-(2-methylpropoxime)phenanthrene-1,2-dicarboxylic acid phenylimide-8α-carboxamide |
| tetradecahydro-8α-carboxymethyl-4bβ,8β-dimethyl-3α-(2-methylpropanyl)phenanthrene-1,2-dicaarboxylic acid phenylimide | tetradecahydro-8α-carboxymethyl-4bβ,8β-dimethyl-3α-(2-methylpropoxime)phenanthrene-1,2-dicarboxylic acid phenylimide |
| tetradecahydro-8α-amino-4bβ,8β-dimethyl-3α-(2-methylpropanoyl) phenanthrene-1,2-dicarboxylic acid phenylimide | tetradecahydro-8α-amino-4bβ,8β-dimethyl-3α-(2-methylpropoxime)phenanthrene-1,2-dicarboxylic acid phenylimide |

EXAMPLE 23

A mixture of 250 parts of tetradecahydro-1α-cyano-4bβ,8β-dimethyl-3α-(2-methylpropanoyl)phenanthrene-8α-hydroxymethyl-10α-carboxylic acid and 25 parts of lactose is granulated with suitable water and to this is added 100 parts of maize starch. The mass is passed through a 16-mesh screen. The granules are dried at a temperature below 60°C. The dry granules are passed through a 16-mesh screen and mixed with 3.8 parts of magnesium stearate. They are then compressed into tablets suitable for oral administration according to the method of this invention.

Similarly, when a equivalent amount of tetradecahydro-2,4bβ,8β-trimethyl-8α-hydroxymethyl-3α-(2-methylpropanoyl)phenanthrene-1α,10aα-dicarboxylic acid, tetradecahydro-4bβ,8β-dimethyl-8α-hydroxymethyl-3α-(2-methylpropanoyl)phenanthrene-1α,2β,10aα-tricarboxylic acid, tetradecahydro-4bβ,8β-dimethyl-8α63 -hydroxymethyl-3α-(2-methylpropanoyl)phenanthrene-1β,2β,10aα-tricarboxylic acid-1β,2β-anhydride, tetradecahydro-1α-cyano-4bβ,8α,8β-trimethyl-3α-(2-methylpropanoyl)phenanthrene-10α-carboxylic acid, tetradecahydro-1α-cyano-2β,4bβ,8α,8β-tetramethyl-3α-(2-methylpropanoyl)phenanthrene-10aα-carboxylic acid, tetradecahydro-2,4bβ,8α,8β-tetramethyl-3α-(2-methylpropanoyl) phenanthrene-1α10aα-dicarboxylic acid, tetradecahydro-4bβ,8α,8β-trimethyl-3α-(2-methylpropanoyl)phenanthrene-1α,2β,10aα-tricarboxylic acid, tetradecahydro-4bβ,8α,8β-trimethyl-3α-(2-methylpropanoyl)phenanthrene-1β,2β,10aα-tricarboxylic acid-1β,2β-anhydride or tetradecahydro-8α-carboxamido-4bβ,8β-dimethyl-3α-(2-methylpropanoyl)phenanthrene-2β,10aα-dicarboxylic acid are used in place of tetradecahydro-1α-cyano-4bβ,8β-dimethyl-3α-(2-methylpropanoyl)phenanthrene-8α-hydroxymethyl-10α-carboxylic acid in the above example, tablets suitable for oral administration are prepared.

What is claimed:

1. A compound of the formula:

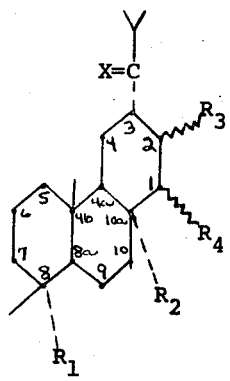

wherein $R_1$ is hydrogen, methyl, methoxycarbonyl, carboxy, hydroxymethyl, formyl or amino and $R_2$, $R_3$ and $R_4$ are each carboxy and X is $=H_2$, phenylhydrazino, $=NOH$ or $=O$.

2. The compound of claim 1 wherein $R_1$ is hydrogen, methyl, hydroxymethyl, amino or methoxycarbonyl and $R_2$, $R_3$ and $R_4$ are each carboxy and X is $=O$, $=H_2$ or $=NOH$.

3. The compound of claim 1 wherein $R_1$ is hydrogen, methyl or hydroxymethyl; $R_2$ is carboxy and $R_3$ and $R_4$ are each carboxy and X is $=O$.

4. Tetradecahydro-4bβ,8β-dimethyl-8α-hydroxymethyl-3α-(2-methylpropanoyl) phenanthrene-1α,2β,10aα-tricarboxylic acid.

* * * * *